(12) United States Patent
Shani et al.

(10) Patent No.: US 6,816,665 B2
(45) Date of Patent: Nov. 9, 2004

(54) CONSTANT POWER OPERATION THERMO-OPTIC SWITCH

(75) Inventors: Yosi Shani, Maccabim (IL); Ben-Zion Kopelovitz, Kefar-Sava (IL)

(73) Assignee: Lynx Photonic Networks Inc., Calabasas Hills, CA (US)

( * ) Notice: Subject to any disclaimer, the term of this patent is extended or adjusted under 35 U.S.C. 154(b) by 21 days.

(21) Appl. No.: 10/140,987

(22) Filed: May 9, 2002

(65) Prior Publication Data

US 2003/0210845 A1 Nov. 13, 2003

(51) Int. Cl.[7] ................................................ G02B 6/00
(52) U.S. Cl. .......................... 385/140; 385/3; 385/40
(58) Field of Search ........................... 385/14, 1, 2, 3, 385/6, 8, 9, 15, 16, 17, 140, 40

(56) References Cited

U.S. PATENT DOCUMENTS

| | | | | |
|---|---|---|---|---|
| 5,513,285 A | * | 4/1996 | Kawashima et al. | 385/16 |
| 5,881,199 A | * | 3/1999 | Li | 385/140 |
| 5,920,666 A | * | 7/1999 | Digonnet et al. | 385/16 |
| 6,215,918 B1 | * | 4/2001 | Keil et al. | 385/16 |
| 6,259,834 B1 | | 7/2001 | Shani | |
| 6,311,004 B1 | * | 10/2001 | Kenney et al. | 385/130 |
| 6,370,290 B1 | * | 4/2002 | Ball et al. | 385/14 |
| 6,370,307 B1 | * | 4/2002 | Bruce et al. | 385/130 |
| 6,400,483 B1 | * | 6/2002 | Mueller-Fiedler et al. | 359/188 |
| 6,501,875 B2 | * | 12/2002 | Zhao et al. | 385/30 |

OTHER PUBLICATIONS

Pechstedt et al., US 2002/0015155, Feb. 7, 2002.*
Seki et al. US 2001/0046353 A1, Nov. 29, 2002.*

Saida, A. Kaneko, T. Goh, M. Okuno, A. Himeno, K. Takiguchi, K. Okamoto, "Athermal silica–based optical add/drop multiplexer consisting of arrayed waveguide gratings and double gate thermo–optical switches," Elect. Lett., 36, 528–529, 2000.

M. Ishii, Y. Hibino, F. Hanawa, H. Nakagome, K. Kato, "Packaging and enviromental stability of thermally controlled A WG multiplexer module with thermoelectric device," J. Light. Technology, vol 6, 258–264, 1998.

N. Kail, H. H. Yao, C. Zawadzki, "Athermal polarization–independent A WG multiplexer using an all polymer approach," European Conference on Integrated Optics, Paderborn, Apr. 4–6, 2001.

M. Kawachi, "Silica waveguides on silicon and their application to integrated–optic components," Optical and Quantum Electronics, 417–426, 1990 (hereinbelow KA W90).

* cited by examiner

Primary Examiner—Frank G. Font
Assistant Examiner—Kevin C Kianni
(74) Attorney, Agent, or Firm—Mark M. Friedman

(57) ABSTRACT

A method for operating a planar lightwave circuit at a constant power consumption, comprises providing a matrix of integrated active elements, heating independently each active element with a separate heating power, and cooperatively operating the heating powers of the active elements to keep a sum of the operating heating powers constant in time independently on the dynamic operation of the element. The active element has two connecting configurations and is operative to have a phase change in a light beam passing through each of the connecting configurations, both connecting configurations being constantly heated. The active element is operable in both analog and digital modes with a constant power consumption.

17 Claims, 6 Drawing Sheets

CONSTANT POWER OPERATION THERMO-OPTIC SWITCH

FIELD AND BACKGROUND OF THE INVENTION

Integration of optical components on a single chip is a desired feature. Integration reduces the number of components, reduces the device size and eliminates all the fiber interconnection. Thus the device reliability is increased, the performance is improved and the overall cost is significantly reduced.

The Planar Lightwave Circuit (PLC) SiO$_2$ on Si technology is a natural and mature technology for integration for the following reasons: (1) many components such as AWGs (Array Waveguide Gratings), switches, VOAs (Variable Optical Attenuator), splitters, taps, etc, have already been produced with this technology, and (2) PLC technology uses almost the same equipment and processes as used by the mature microelectronic industry. Some PLC integrated components have already been fabricated, most of them in the configuration of the basic OADM (Optical Add Drop Multiplexer) module [T. Saida, A. Kaneko, T. Goh, M. Okuno, A. Himeno, K. Takiguchi, K. Okamoto, "Athermal silica-based optical add/drop multiplexer consisting of arrayed waveguide gratings and double gate thermo-optical switches," Elect. Lett., 36, 528–529, 2000], shown in FIG. 1. FIG. 1 shows an integrated PLC OADM module 10 with an AWG multiplexer ("passive" component) 12, N "add/drop" 2×2 switches 14 ("active" components) and an AWG multiplexer 16 ("passive" component). A major problem in this integration lies in preventing the active (heat producing) components from affecting the performance of the (temperature) sensitive passive components. A change in the configuration of a thermo-optic switch matrix is usually followed by a variation in the local distribution of the operating heaters, as shown in U.S. Pat. No. 6,259,834 to Shani. There, the distribution of the operating ("on" stage) switches depends on the switch matrix configuration, and switches that change from a heated to a non-heated state induce local temperature non-uniformities on the wafer. Thus, even if the whole wafer is temperature-stabilized, changing a switch matrix configuration can affect the integrated passive components performance.

Prior art methods for removing the temperature sensitivity include: (1) fabricating active and passive components on separate chips and butt-coupling them; (2) separating between the active and passive components which are integrated on the same chip, and (3) designing the passive components to be a-thermal components [e.g. M. Ishii, Y. Hibino, F. Hanawa, H. Nakagome, K. Kato, "Packaging and environmental stability of thermally controlled AWG multiplexer module with thermoelectric device," J. Light. Technology, vol 6, 258–264, 1998; N. Kail, H. H. Yao, C. Zawadzki, "Athermal polarization-independent AWG multiplexer using an all polymer approach," European Conference on Integrated Optics, Paderborn, Apr. 4–6 2001, Postdeadline paper]. However, these prior art methods suffer from a number of drawbacks and disadvantages, including the use of non-mature polymer technology, and hybrid integration of half waveplates.

The prior art operation and use of thermo-optic switches is illustrated next. FIG. 2 shows a common Mach Zehnder Interferometer (MZI) thermo-optic switch 100. Such switches are known in the art, and a detailed description of one is provided for example in M. Kawachi, "Silica waveguides on silicon and their application to integrated-optic components," Optical and Quantum Electronics, 417–426, 1990 (hereinbelow KAW90). Switch 100 consists of two 3 dB couplers 102 and 104 combined by two waveguide arms 106 and 108, with an electrode ("heater") 110 on one of the waveguide arms (in this case, arm 106). In the "off" position or stage, electrode 110 is not activated (not turned on) and therefore introduces no phase difference, and the light passes from an input 112 on one arm (e.g. arm 106) to an output 114 on the other arm (108), i.e. following the "1">"2" path in FIG. 2. In the "on" position electrode 110 is activated, a 180 degree phase shift due to the thermo-optic effect is introduced by the electrode on the light passing in arm 106, and the light stays in the input waveguide (arm 106) leading to an output 116, i.e. following the "1">"1" path. The action of the switch is "digital" in the sense that it operates in two positions only, one position requiring heating, the other not requiring it. The passage from a heated to a non-heated state is the main source of temperature non-uniformity on the wafer or chip.

In order to build a constant power operating switch, i.e. to have a constant heating power during both the "on" and "off" stages (and therefore remove the temperature non-uniformity), a 90 degree phase shift is added between the waveguide arms, and electrodes 110 and 120 are positioned on both MZI arms (106 and 108 respectively), as shown in FIG. 3. In this case, with no heating ("zero power consumption") no additional phase shift is introduced and the light goes to both output arms (114 and 116), i.e. the switch functions as a 3 db splitter. This is the main use of this architecture, as described in both U.S. Pat. No. 6,259,834 to Shani and in KAW90. For a "switch" operation, path "1">"1" is connected when heater 110 is turned "on" (and heater 120 is "off"), and path "1">"2" is connected when heater 120 is turned "on" (and heater 110 is "off"). Thus, in this "switch" or "digital" mode, there is always one heater in an "on" position (and one heater in an "off" position), independently of whether the connection is "1">"1" or "1">"2". However, if the device is used both as a splitter (both heaters "off", zero power) and as a switch (one heater "on", the other "off"), there is still a non-uniform and time dependent temperature distribution on the chip.

There is thus a widely recognized need for, and it would be highly advantageous to have, a method for operating such a switch that does not suffer from the disadvantages of prior art switches, and that provides a uniform temperature distribution on a PLC, thus not affecting the integrated passive components performance.

SUMMARY OF THE INVENTION

The present invention is of a method used to eliminate temperature variations caused by active components in PLCs. More specifically, the method of the present invention can be used to design an active component (e.g. switch) in such a way that its generated heat does not depend on its configuration (i.e. the same heat generation exists if the active component is at an "on" or at an "off" position).

According to the present invention there is provided a method for obtaining a constant and uniform temperature on a planar lightwave circuit, comprising: a) providing at least one active element having two connecting configurations and operative to have a phase change in a light beam passing through each of the connecting configurations, and b) constantly heating both of the connecting configurations, thereby achieving a substantially constant and uniform temperature distribution on the planar lightwave circuit.

According to one feature of the method of the present invention for obtaining a constant and uniform temperature on a planar lightwave circuit, the step of providing at least one active element includes providing at least one thermo-optic switch.

According to another feature of the method of the present invention for obtaining a constant and uniform temperature on a planar lightwave circuit, the step of providing at least one thermo-optic switch includes providing a waveguide Mach Zehnder Interferometer switch having one input waveguide, two identical waveguide arms, and two output waveguides, wherein the connecting configurations include a first connecting configuration defined by connecting the input waveguide to one of the output waveguides, and a second connecting configuration defined by connecting the input waveguide to the other of the output waveguides.

According to yet another feature of the method of the present invention for obtaining a constant and uniform temperature on a planar lightwave circuit, the step of constantly heating both of said connecting configurations includes providing a heater connected to each of the waveguide arms, and simultaneously heating each of the heaters using a respective heating power P in order to achieve a desired power difference configuration $\Delta P$ related to the phase change in each of the waveguide arms.

According to yet another feature of the method of the present invention for obtaining a constant and uniform temperature on a planar lightwave circuit, the substep of simultaneously heating using a respective heating power P includes using a power P1 for one of the heaters and a power P2 for the other of said heaters, wherein P1, P2 and $\Delta P$ are expressed by equation 2.

According to yet another feature of the method of the present invention for obtaining a constant and uniform temperature on a planar lightwave circuit, P1 and P2 and $\Delta P$ as expressed by equation 2 render the Mach Zehnder Interferometer switch operable in a digital mode.

According to yet another feature of the method of the present invention for obtaining a constant and uniform temperature on a planar lightwave circuit, P1 and P2 and $\Delta P$ as expressed by equation 2 render the Mach Zehnder Interferometer switch operable in an analog mode.

According to yet another feature of the method of the present invention for obtaining a constant and uniform temperature on a planar lightwave circuit, the Mach Zehnder Interferometer switch is made of silica on a silicon substrate.

According to the present invention there is provided a method for operating a planar lightwave circuit at a constant power consumption, comprising a) providing a matrix of integrated active elements, b) providing a heating power to each active element to independently heat the active element, and c) cooperatively operating the heating powers of the active elements to keep a sum of the operating heating powers constant.

According to one feature of the method of the present invention for operating a planar lightwave circuit at a constant power consumption, each active element is a thermo-optic switch further characterized by having two connecting configurations and operative to have a phase change in a light beam passing through each of said connecting configurations.

According to another feature of the method of the present invention for operating a planar lightwave circuit at a constant power consumption, the step of providing integrated thermo-optic switches includes providing waveguide Mach Zehnder Interferometer switches, each such Mach Zehnder Interferometer switch having one input waveguide, two identical waveguide arms, and two output waveguides, wherein the connecting configurations include a first connecting configuration defined by connecting the input waveguide to one of the output waveguides, and a second connecting configuration defined by connecting the input waveguide to the other of the output waveguides.

According to yet another feature of the method of the present invention for operating a planar lightwave circuit at a constant power consumption, the step of providing a heating power of each Mach Zehnder Interferometer switch includes constantly heating both of the connecting configurations.

According to yet another feature of the method of the present invention for operating a planar lightwave circuit at a constant power consumption, the substep of constantly heating both of the connecting configurations further includes providing a heater connected to each of the waveguide arms, and simultaneously heating each of the heaters using a respective heating power P in order to achieve a desired power difference configuration $\Delta P$ related to the phase change in each of the waveguide arms.

According to yet another feature of the method of the present invention for operating a planar lightwave circuit at a constant power consumption, the substep of simultaneously heating using a respective heating power P includes using a power P1 for one of the heaters and a power P2 for the other of the heaters, wherein P1, P2 and $\Delta P$ are expressed by equation 2.

According to yet another feature of the method of the present invention for operating a planar lightwave circuit at a constant power consumption, P1, P2 and $\Delta P$ as expressed by equation 2 render the Mach Zehnder Interferometer switch operable in a digital mode.

According to yet another feature of the method of the present invention for operating a planar lightwave circuit at a constant power consumption, P1, P2 and $\Delta P$ as expressed by equation 2 render the Mach Zehnder Interferometer switch operable in an analog mode.

According to yet another feature of the method of the present invention for operating a planar lightwave circuit at a constant power consumption, the Mach Zehnder Interferometer switch is made of silica on a silicon substrate.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention discloses a method of designing a thermo-optic switch that is operated within a constant heating (power), thus eliminating unwanted effects on passive components, such as existing in prior art solutions. The principles and operation of a constant power thermo-optic switch according to the present invention may be better understood with reference to the drawings and the accompanying description.

Figure 1:
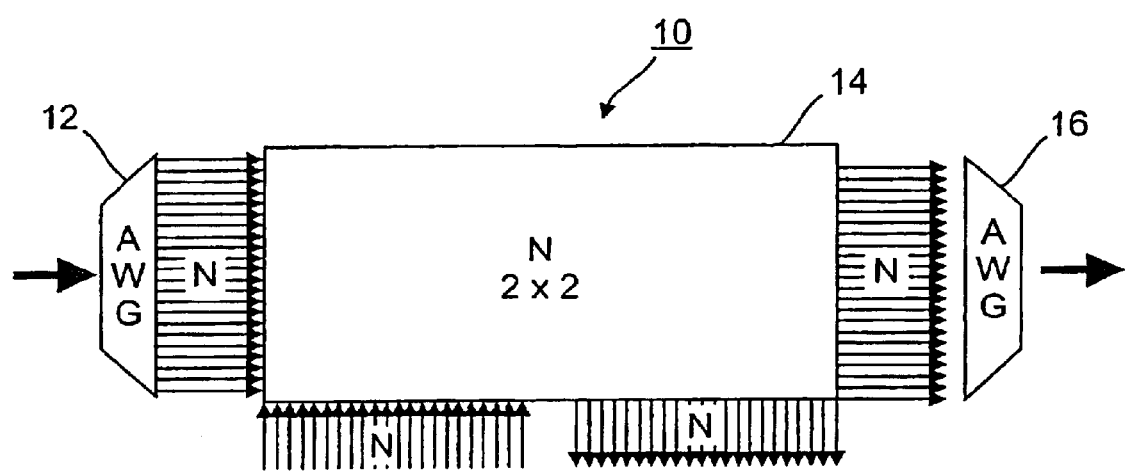
FIG. 1 shows a common PLC OADM module.
Figure 2:
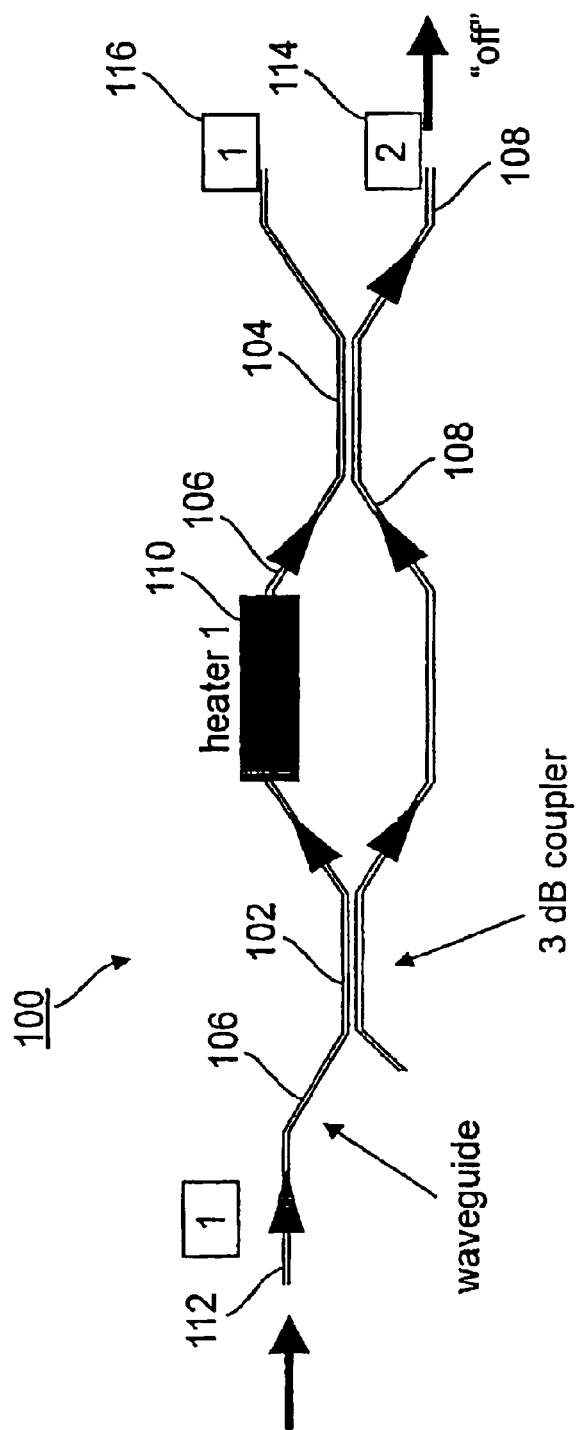
FIG. 2 shows a common prior art MZI thermo-optic switch having one heater on one arm.
Figure 3:
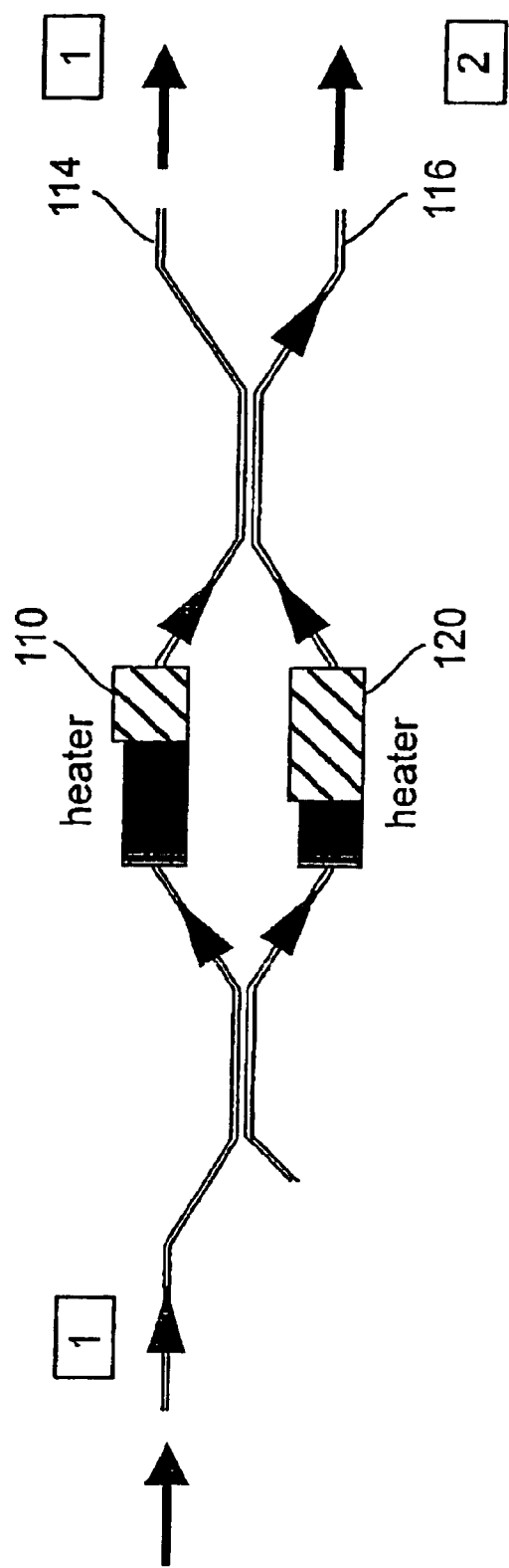
FIG. 3 shows a MZI with two heaters used for phase shifting elements between two 3 dB couplers.

Referring now again to the drawings, the normal use of the configuration or "architecture" of the thermo-switch of FIG. 3 is "digital", as explained above. The main contribution of the present invention is in providing a method for using this architecture to obtain a constant heating switch operable in both a digital and an "analog" mode. "Analog" means combined "1">"1" and "1">"2" switching configurations with non-zero optical power in either connection. While the "digital" "1">"1" or "1">"2" connections of prior art are obvious, an "analog" connection as suggested by the present invention is not. For example, if the architecture (or active device) of FIG. 3 is used for 3 dB splitting (in addition to switching between two states), instead of working at zero power consumption (as in prior art), both heaters will be heated equally to P/2, where P is the power required to get the "1">"1" or "1">"2" connection. Since both heaters are heated to the same temperature, the added phase shift is the same in each one of the MZI arms. Therefore, the added phase difference between the MZI arms is zero, which is an identical result with that of the zero power (no heating) case.

The algorithm for operating the constant power active device can be written as:

$$P2-P1=\Delta P$$

$$P1+P2=P \quad (1)$$

where P is constant (equal to the power required for the digital "1">"1" or "1">"2" configurations). P1 and P2 are the heating powers which are driven through heaters 110 and 120, respectively, and ΔP is the required power difference for achieving the required splitting ratio [−P?ΔP?P]. From the above we obtain $$P1=0.5*(P-\Delta P)$$

$$P2=0.5*(P+\Delta P) \quad (2)$$

Therefore, for every required ΔP configuration there are precise P1 and P2 heating powers. For example, for a 30/70 ratio of the optical power in the "1">"1"/"1">"2" connections, ΔP=2/π*P and P1 and P2 should be 0.182*P and 0.818*P. It should be noted that in order to keep P constant also during the transition (switching) time, between an "on" and an "off" state, P1 and P2 should be changed simultaneously. It is also clear that the above algorithm is not restricted to the MZI configuration described in FIG. 3, but is a more general method that can be applied also to other switch structures.

Figure 4A:
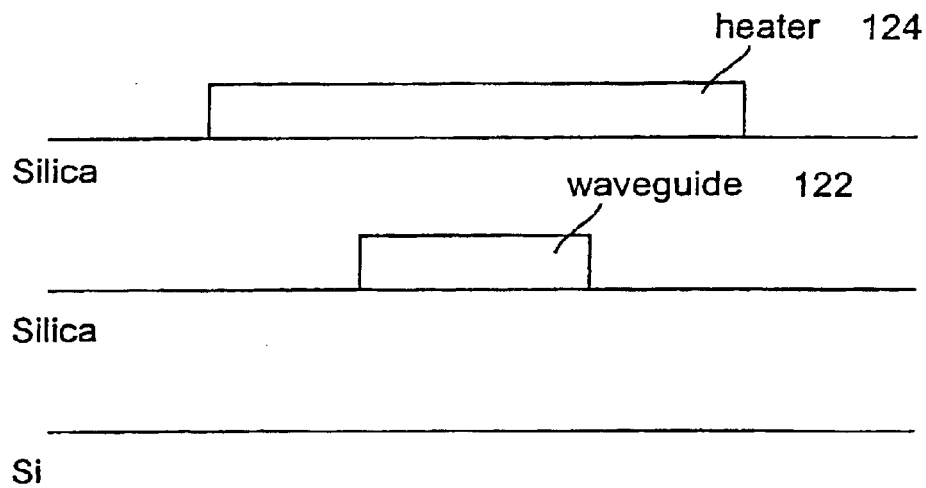
FIG. 4 shows in cross-section a heater/waveguide combination, and its temperature distribution profile.
Figure 4B:
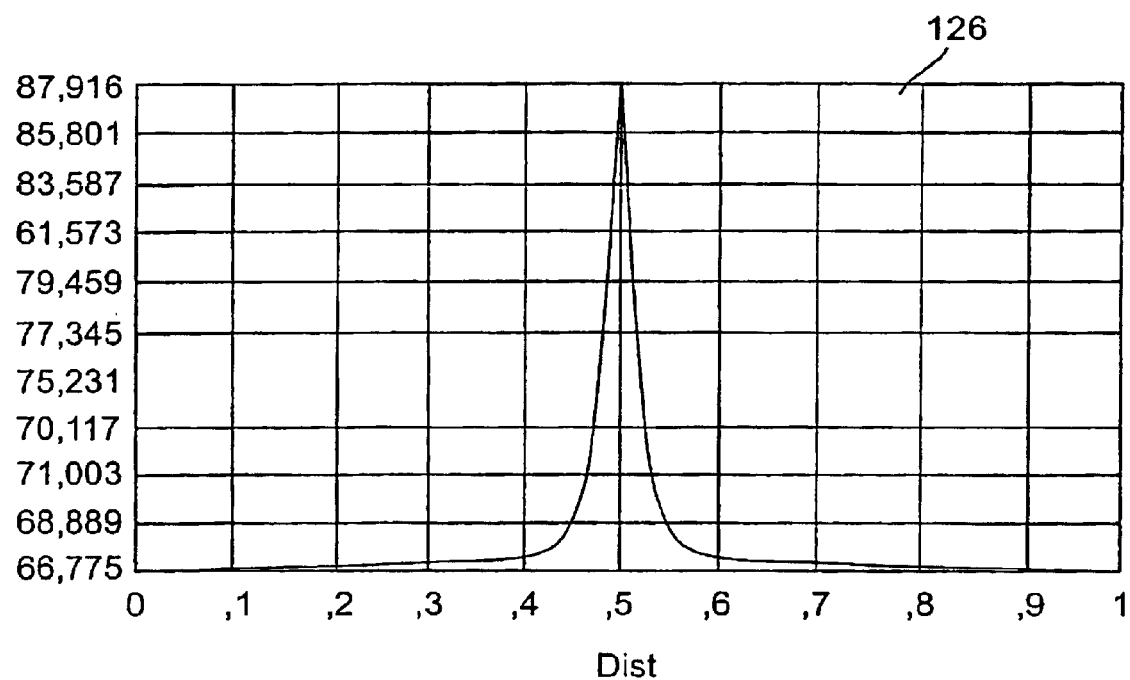

As an example, FIG. 4 shows in (a) a cross-section of a waveguide 122 with a heater 124 above it, and in (b) the calculated temperature distribution across the width of a heated waveguide. The distance "DIST" is given in mm, and the heater is located about 15 micrometers above the waveguide. From FIG. 4 it can be seen that the lateral distance (along the waveguide width and perpendicular to its length axis) at which the effect of a heater (a temperature peak 126 at the center of the distribution in (b)) becomes negligible is about 0.1 mm. That means that a change in the location of a heater by up to about 0.1 mm (which is a typical distance between the two heaters on the two MZI arms), will result in a negligible heat distribution changes at distances of ca. 0.5–1 mm. Thus, sequential "on" and "off" operation of two heaters, 0.1 mm apart, does not affect significantly the temperature distribution at distances larger than about 5–10 times the inter-heater distance. In other words, the constant power operation as described above does not affect any device positioned away from the active device at a distance 5–10 time larger than the switch inter-heater separation. The effect of turning switches "on" or "off" is a cumulative effect.

Figure 5:
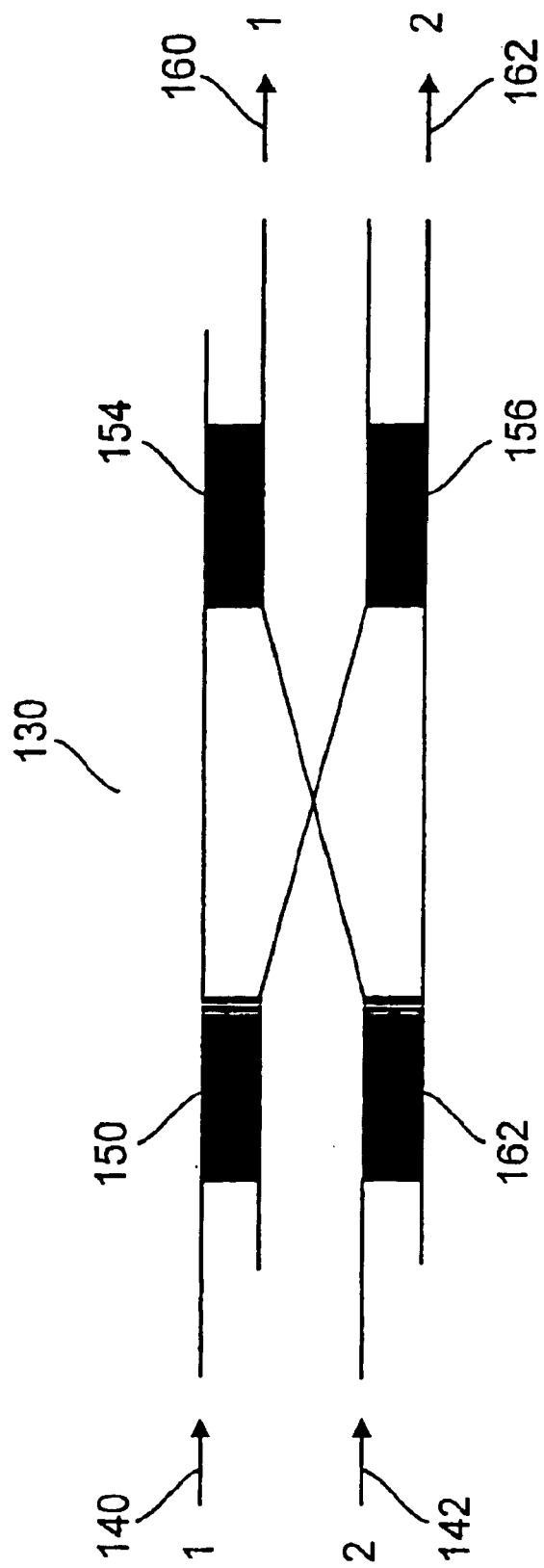
FIG. 5 shows a double stage 2×2 switch matrix consisting of four thermo-optic switch elements, designed and used according to the method of the present invention.

The method of operating active devices at a constant heating power described above can be also applied to a switch matrix, where the sum of all the heating powers of the switches is kept constant. If the switches forming the switch matrix are close to each other, then the effect of a small variation in the position of the operating switches on the temperature distribution on the chip is negligible. This is similar to the case of a single switch such as the switch of FIG. 3, where the surroundings are not sensitive to whether heater 110 or heater 120 (or both) are working (the typical distance between them is 0.1 mm). An example is illustrated on the double stage 2×2 switch matrix 130 shown in FIG. 5 (double stages are commonly used in integrated optics to improve switch performance). Switch matrix 130 includes two input arms 140 and 142, four switches 150, 152, 154 and 156, and two output arms 160 and 162. Conversely, the inputs can serve as outputs and the outputs as inputs. Preferably, the switches are MZI switches with heaters positioned on each arm as described in FIG. 3, although other active elements, for example MZI variable optical absorbers (VOAs) can also benefit from the application of the present method. In this switch matrix, "1">"1" (140 to 160) and "2">"2" (142 to 162) connections are achieved by setting switches 152 and 154 to "on", while the "1">"2" and "2">"1" connections are achieved by setting switches 150 and 156 to "on". Thus, there are always two switches that are "on", and these switches are close to each other. The total power of the neighbor switches (in FIG. 4) 150 and 152 is constant, as is the total power of switches 154 and 156. In contrast with present practice, in which some switches are heated while others are not, depending on their operation, in this embodiment of the method of the present invention, the total power of a group of switches is kept constant at all times. This "constant power" mode ensures a much better temperature uniformity than present practice, in which some switches on a wafer are "on" and some are "off" at any given time, as shown for example in FIG. 6.

Figure 6:
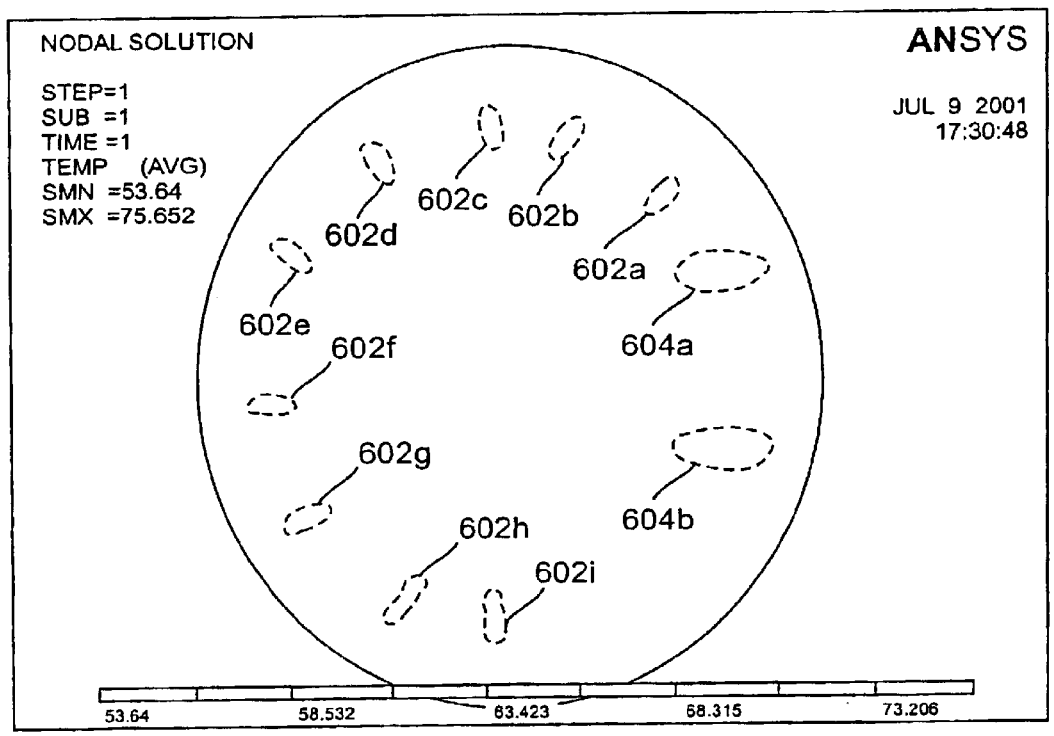
FIG. 6 shows a wafer with active and non-active device groups, with a superimposed computer simulation of the temperature distribution.

FIG. 6 shows schematically a thermal experiment in which a number of heater groups are positioned on a wafer 600. In each group, some heaters are "on" and some are "off". There are 9 groups of heaters 602a to 602i with a total power consumption of 5W, and two groups of heaters 604a and 604b, each one of the latter groups operating at 4.4W. That is, in this thermal experiment, only some of the heaters in the 9 groups 602a to 602i are carrying current for a total power consumption of 5W, while heaters in each group 602 carry enough current to dissipate 4.4W. In other words, in groups 602a to 602i the heating powers of the active elements are cooperatively operated to keep a sum of the operating heating powers constant.

As can be seen in FIG. 6, the area near switches 604 is much warmer (stronger contrast with the surrounding background) than the rest of the wafer, including with areas around switches 602. It is clear that the thermal distribution depends on the location of the heating elements, and will change upon a change in the state ("on" or "off") of each group. The heating powers of the active elements are cooperatively operated to keep a sum of the operating heating powers constant.

The point is that heaters 602*a* to 602*i* illustrate the constant power mode of operation of switch matrices as described herein, yielding a much better temperature uniformity over large parts of the wafer than switch matrices operated according to prior art practice.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for operating a planar lightwave circuit at a constant power consumption, comprising
   a. providing at least one active element having two connecting configurations and operative to have a phase change in a light beam passing through each of said connecting configurations, and
   b. constantly heating both of said connecting configurations, whereby said constant heating provides a substantially uniform and constant temperature distribution across the planar lightwave circuit.

2. The method of claim 1, wherein said step of providing at least one active element includes providing at least one thermo-optic switch.

3. The method of claim 2, wherein said step of providing at least one thermo-optic switch includes providing a waveguide Mach Zehnder Interferometer switch having one input waveguide, two identical waveguide arms, and two output waveguides, and wherein said connecting configurations include a first connecting configuration defined by connecting said input waveguide to one of said output waveguides, and a second connecting configuration defined by connecting said input waveguide to the other of said output waveguides.

4. The method of claim 3, wherein said step of constantly heating both of said connecting configurations includes:
   i. providing a heater connected to each of said waveguide arms, and
   ii. simultaneously heating each of said heaters using a respective heating power P in order to achieve a desired power difference configuration $\Delta P$ related to said phase change in each of said waveguide arms.

5. The method of claim 4, wherein said substep of simultaneously heating using a respective heating power P includes using a power P1 for one of said heaters and a power P2 for the other of said heaters, and wherein said P1, P2 and $\Delta P$ are expressed by $P1=0.5*(P-\Delta P)$ and $P2=0.5*(P+\Delta P)$.

6. The method of claim 5, wherein said P1, P2 and $\Delta P$ as expressed by $P1=0.5*(P-\Delta P)$ and $P2=0.5*(P+\Delta P)$ render said Mach Zehnder Interferometer switch operable in a digital mode.

7. The method of claim 5, wherein said P1, P2 and $\Delta P$ as expressed by $P1=0.5*(P-\Delta P)$ and $P2=0.5*(P+\Delta P)$ render said Mach Zehnder Interferometer switch operable in an analog mode.

8. The method of claim 3, wherein said Mach Zehnder Interferometer switch is made of silica on a silicon substrate.

9. A method for operating a planar lightwave circuit at a constant power consumption, comprising
   a. providing a matrix of integrated active elements,
   b. providing a heating power to independently heat each said active element, and
   c. cooperatively operating said heating powers of said active elements to keep a sum of said operating heating powers constant.

10. The method of claim 9, wherein each said active element is a thermo-optic switch further characterized by having two connecting configurations and operative to have a phase change in a light beam passing through each of said connecting configurations.

11. The method of claim 10, wherein said step of providing integrated thermo-optic switches includes providing waveguide Mach Zehnder Interferometer switches, each such Mach Zehnder Interferometer switch having one input waveguide, two identical waveguide arms, and two output waveguides, and wherein said connecting configurations include a first connecting configuration defined by connecting said input waveguide to one of said output waveguides, and a second connecting configuration defined by connecting said input waveguide to the other of said output waveguides.

12. The method of claim 11, wherein said step of providing a heating power of each said Mach Zehnder Interferometer switch includes constantly heating both of said connecting configurations.

13. The method of claim 12, wherein said substep of constantly heating both of said connecting configurations further includes:
   i. providing a heater connected to each of said waveguide arms, and
   ii. simultaneously heating each of said heaters using a respective heating power P in order to achieve a desired power difference configuration $\Delta P$ related to said phase change in each of said waveguide arms.

14. The method of claim 13, wherein said substep of simultaneously heating using a respective heating power P includes using a power P1 for one of said heaters and a power P2 for the other of said heaters, and wherein said P1, P2 and $\Delta P$ are expressed by $P1=0.5*(P-\Delta P)$ and $P2=0.5*(P+\Delta P)$.

15. The method of claim 14, wherein said P1, P2 and $\Delta P$ as expressed by $P1=0.5*(P-\Delta P)$ and $P2=0.5*(P+\Delta P)$ render said Mach Zehnder Interferometer switch operable in a digital mode.

16. The method of claim 14, wherein said P1, P2 and $\Delta P$ as expressed by $P1=0.5*(P-\Delta P)$ and $P2=0.5*(P+\Delta P)$ render said Mach Zehnder Interferometer switch operable in an analog mode.

17. The method of claim 9, wherein said Mach Zehnder Interferometer switch is made of silica on a silicon substrate.

* * * * *